United States Patent [19]

Mann

[11] E Re. 31,571

[45] Reissued May 1, 1984

[54] MULTIPLE COMPARTMENT PACKAGING

[76] Inventor: Anne V. Mann, 3154 Sawtell Blvd. #4, Los Angeles, Calif. 90066

[21] Appl. No.: 439,929

[22] Filed: Nov. 8, 1982

Related U.S. Patent Documents

Reissue of:

[64] Patent No.: 4,232,787
Issued: Nov. 11, 1980
Appl. No.: 26,136
Filed: Apr. 2, 1979

[51] Int. Cl.[3] ..... B65D 85/20; B65D 75/58; B65D 77/32

[52] U.S. Cl. ..... 206/443; 206/615; 206/820

[58] Field of Search ..... 206/443, 820, 264, 491, 206/615, 605, 489

[56] References Cited

U.S. PATENT DOCUMENTS

| | | | |
|---|---|---|---|
| 2,138,241 | 11/1938 | Koch et al. | 206/491 |
| 2,984,346 | 5/1961 | Holley | 206/820 |
| 3,325,000 | 6/1967 | Edwards | 206/264 |
| 3,394,869 | 7/1968 | Fontana et al. | 206/820 |

FOREIGN PATENT DOCUMENTS

| | | | |
|---|---|---|---|
| 374259 | 4/1907 | France | 206/489 |

*Primary Examiner*—William T. Dixson, Jr.
*Attorney, Agent, or Firm*—J. William Wigert, Jr.

[57] ABSTRACT

A multiple compartment [food] package of a heat sealed thermal plastic material is provided with opening means associated with each compartment to enable individual units, *such as* [of] food, to be removed without affecting the air-tight seal of the remaining [food] compartments.

6 Claims, 3 Drawing Figures

MULTIPLE COMPARTMENT PACKAGING

Matter enclosed in heavy brackets [ ] appears in the original patent but forms no part of this reissue specification; matter printed in italics indicates the additions made by reissue.

BACKGROUND OF THE INVENTION

The present invention relates to [food] packaging and [food] containers, and more particularly to packaging of multiple [food] units.

In recent years there has been a great proliferation of factory packaged foods. Particularly common is the use of heat sealable thermal plastic materials, such as polyethylene, which are used, for example, for packaging hot dogs, sausages, bacon, and other food materials where it is important to maintain a sealed and airtight condition to preserve the enclosed food.

Typically thermal plastic packaging is used to package a large number of food items. For example, a package of hot dogs, typically contains 6 to 10 hot dogs contained within one airtight plastic container. This packaging arrangement is suitable if all of the food is going to be cooked immediately when the package is opened, or soon thereafter. But is has obvious drawbacks where the user only wishes to cook one or two hot dogs at a time. This is particularly true, for example, for a small family or for single individuals. At present, one may either prepare all of the food or else risk eating food which is not as fresh as it was at the time the package was opened. Either way, much of the food may be wasted.

SUMMARY OF THE PRESENT INVENTION

It is therefore an object of the invention to provide an improved way of packaging multiple [food] units;

Another object of the invention is to provide an improved packaging arrangement of food allowing individual units of food to be removed from the package without unsealing the remaining units of food.

Another object of the invention is to provide an improved [food] container made of thermal plastic materials permitting individual units [of food] to be removed, while permitting the remaining packaged units [of food] to be maintained airtight.

In accordance with the present invention a plurality of [food] units, for example hot dogs, are packaged by the manufacturer into individual sealed compartments. Opening means are provided for each of these compartments to enable each compartment to be opened and the food contained therein to be removed without disturbing the integrity of the remaining sealed compartments.

In one embodiment in the invention the opening means is provided by means of a bead or thickened strip of plastic material formed as a part of an individual [food] compartment. When, *for example* [the] food in a compartment is desired, the user pulls one end of the beaded strip and due to its greater strength relative to the remainder of the compartment the user is able to tear open the compartment along its length. The food can then be easily removed without affecting the remaining food.

In accordance to another aspect of the invention, a serrated tear strip is provided along a portion of each individual compartment. When the user desires to open an individual compartment the serration is perforated as for example with the thumbnail, to tear open the compartment and allow the item [of food] to be removed.

DESCRIPTION OF THE PREFERRED EMBODIMENTS

Figure 1:
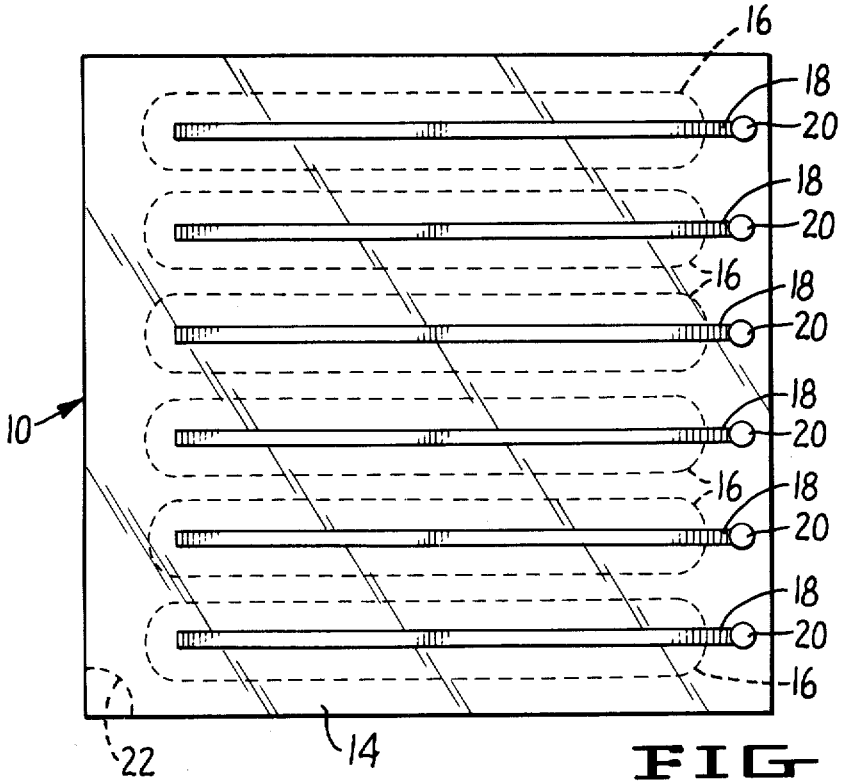
FIG. 1 is a top view of one embodiment of a multiple compartment food packaging arrangement of the present invention.
Figure 2:
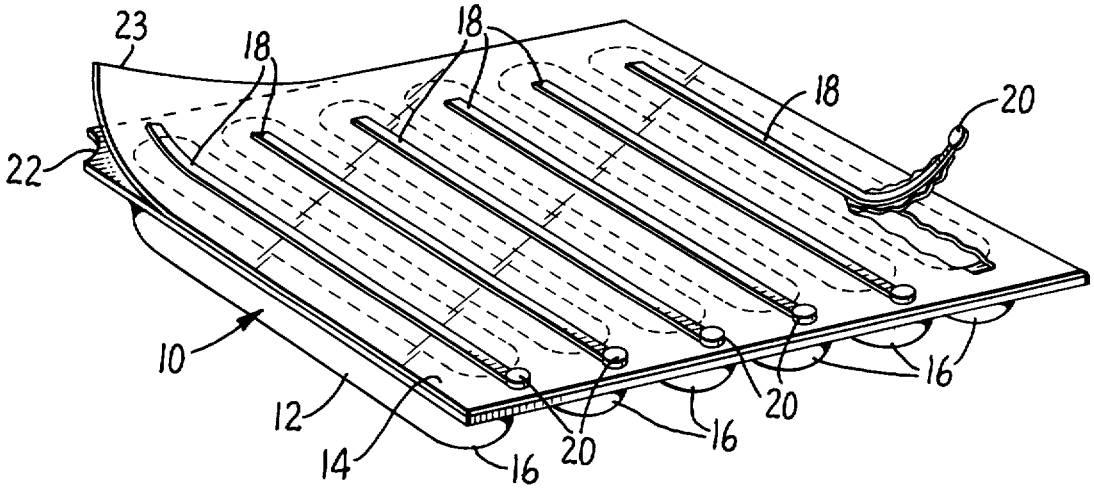
FIG. 2 is a respective view of the food packaging arrangement of FIG. 1.

FIGS. 1 and 2 illustrate a multiple compartment food package 10 in accordance with the present invention. Package 10 is formed in two parts, a bottom receptacle 12 and a top cover or sheet 14. The bottom receptacle 12 has a basket-like shape with contours or compartments 16 generally designed for the particular type of food to be contained. For purposes of this description the individual food units are hot dogs and the receptacle 16 are made to hold individual hot dogs.

In some cases the receptacle 12 is pre-formed with the individual compartments 16. In other cases, particularly where the receptacle 12 is made of a lighter weight plastic material, the individual compartments 16 are formed by the process of contouring a plastic sheet to the food items during the vacuum sealing process.

In the embodiments of FIGS. 1 and 2, the top sheet 14 is placed on top of the receptacle 12 after the hot dogs have been placed within the basket like receptacle 12. The top sheet 14 is thermally sealed to the bottom receptacle 12 in the conventional manner.

In accordance with the present invention the top sheet 14 is formed with a series of longitudinally beads or strips 18. As may be seen in FIG. 1, each of the beaded strips 18 extends along most of the length of the individual compartments 16. One end of each of the beaded strips 18 extends beyond an end of compartment 16. The beaded strips 18 has a thicker cross-section than the adjacent portions of the top flat piece 14. This enables the user who grabs hold of the end 20 of the strip 18 to pull the strip 18 to rip open an individual compartment containing food, as shown in FIG. 2. Because the strip 18 has a greater thickness than the remainder of the sheet 14 it has a greater tensil strength so when it is pulled by the user the thin plastic material along each side of strip 20 gives way and the individual compartment 16 is opened. It is to be noted that the remaining compartments 16 remains sealed and fresh until such time as the user elects to open another one of the individual compartment 16.

The freshness strips 18 can be formed in the top cover sheet 14 when the cover sheet 14 itself is made. A convenient way of providing the bead 18 is to make it integral with cover sheet 14, as for example by forming a bead profile in the film as the top sheet 14 is made. Of course, the beaded strip 18 can be formed in other ways.

In the embodiment shown in FIGS. 1 and 2 the bead 18 is located centrally of the individual compartments and extends along the entire length. Depending upon the particular type of food being packaged, the bead 18 may be located off center or the edge of individual compartment. Additionally, depending upon the particular food item, the strip 18 may not need to extend along the entire length of the individual compartment 16.

In accordance with another aspect of the invention means are provided to enable the food package 10 in FIGS. 1 and 2 to be opened so as to allow all of the food to be removed at one time, in the event that the user desires to cook all of the food, rather than individual items. This is accomplished by notching one corner 22 of receptacle 12. As shown in FIG. 2 if the user desires to gain access to all of the hot dogs at one time the user grabs the corner 23 of sheet 14 removes the entire top sheet 14.

Figure 3:
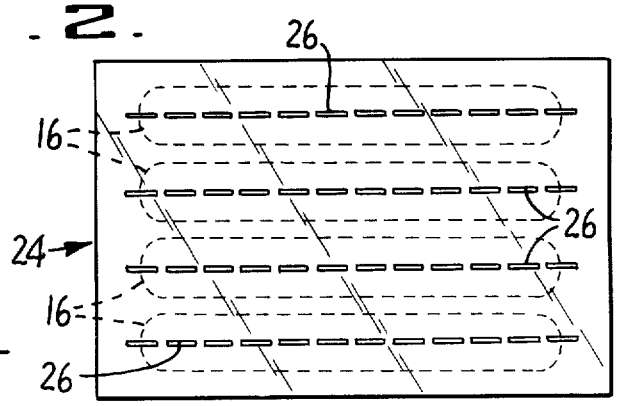
FIG. 3 is a top view of another embodiment of a multiple compartment food packaging arrangement of the present invention.

FIG. 3 shows an alternative food package 24 in accordance with the present invention. Instead of a thickened freshness strip 18 as in FIGS. 1 and 2 a serrated tear line 26 is formed in the top cover sheet 14 prior to it being vacuum sealed to the receptacle 12. To open an individual compartment 16 the user, for example, must run his thumb or thumbnail along the serrated tear line, thereby opening an individual compartment 16. In order to prevent damage of the food contained within each of the compartments 14 it may be desirable to have the serrated tear line near an edge of the compartment 16, rather than in the center as shown in FIG. 3.

Typical thermal plastic materials suitable for forming packages in accordance with the present invention includes low density polyethylene and heavy plasticized polyvinyl chloride films. Of course, there are other plastic as well as non-plastic materials that may be utilized without departing from the principals of the present invention.

In the embodiments of FIGS. 1 and 2 the freshness strip 18 extends beyond the compartment 18 to the edge or nearly to the edge of the package 10. It may be desirable, in some applications, to provide perforations along each side of the strip 18 near the edge of the package to facilitate the beginning of the tearing operation when the user begins to open a compartment. In other applications it may not be necessary to run the freshness strip 18 beyond the individual compartment 16. For example, the freshness strip 18 need not extend beyond the boundaries of the individual compartment. For example, it might extend only along the central portion of each compartment.

I claim:

1. A sealed package for holding a plurality of [food] units comprising:

a base receptacle with compartments for holding individual [food] units;

a lid piece for covering said base receptacle and each of said compartments and for maintaining in an airtight state individual [food] units within individual ones of said compartments;

and opening means associated with each of said compartments and forming a part of said lid piece for individually opening each of said compartments to remove [food] units without disturbing the integrity of the remaining compartments and wherein said opening means comprising a beaded strip formed in said lid and extending along each of said compartments.

2. A sealed container as in claim 1 including means for removing said lid piece to allow access to all of said [food] units.

3. A sealed container as in claim 1 wherein said base receptacle and lid are of a heat-sealed plastic material.

4. A multiple compartment [food] package having opening means comprising a beaded strip extending along each compartment to allow [food] *items contained therein* to be removed from one compartment at a time without affecting the sealed condition of the remaining compartments.

5. A [food] container as in claim 4 wherein said [food] package is made of a heat-sealed plastic material.

6. The [food] container of claims 4 or 5 including means for allowing all of the [food] *items contained within said compartments* to be removed at once in lieu of said opening means.

* * * * *